United States Patent Office 2,749,329
Patented June 5, 1956

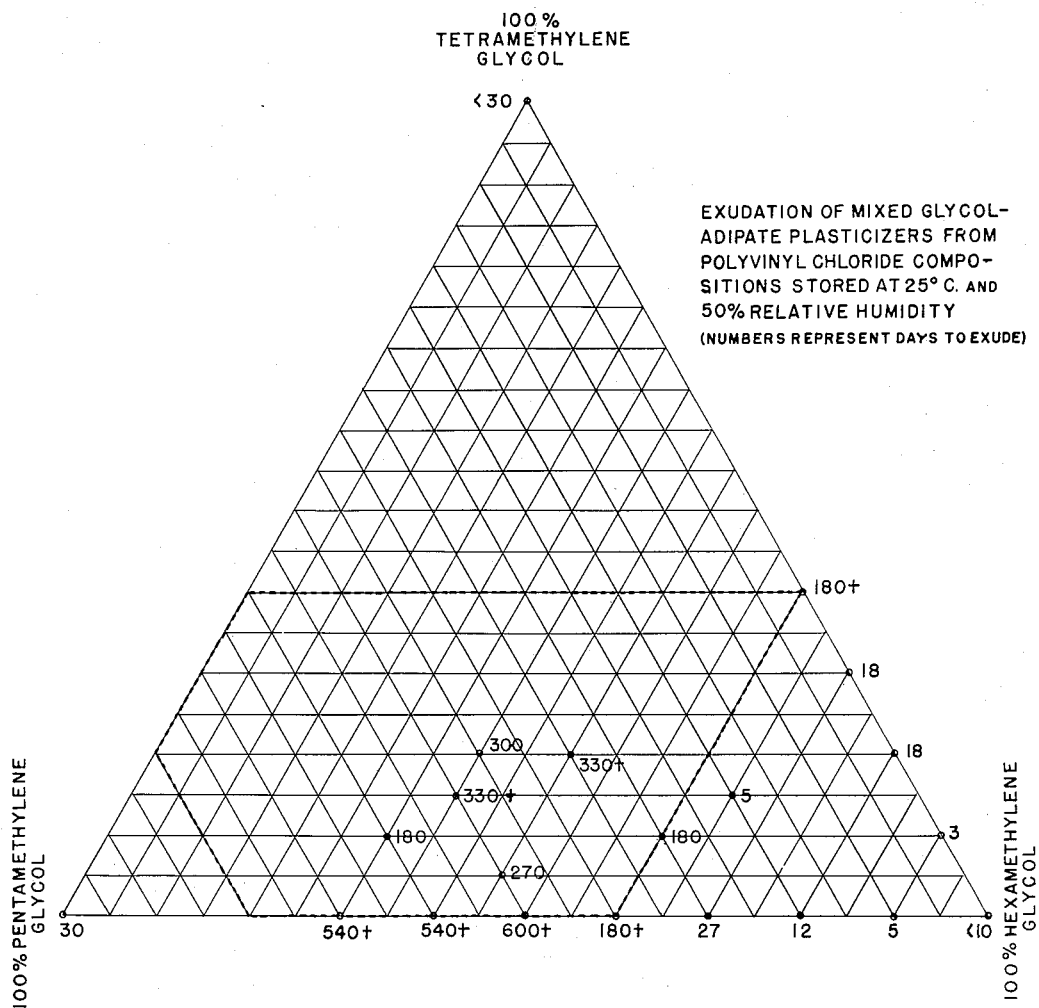

2,749,329

COMPOSITIONS COMPRISING POLYESTER PLASTICIZERS

John L. Ludlow, Wilmington, Del., assignor to E. I. du Pont de Nemours and Company, Wilmington, Del., a corporation of Delaware Application March 30, 1951, Serial No. 218,471

1 Claim. (Cl. 260—75)

This invention relates to mixed polyester plasticizers and compositions containing the same. This application is a continuation-in-part of my copending application S. N. 166,303 which was filed on June 6, 1950.

Heretofore certain polyesters, including alkyd resins, have been employed as plasticizers for vinyl chloride polymers. Moreover, numerous high-boiling monomeric esters also have been employed as plasticizers for polyvinyl chloride; included among these are branched chain dialkyl phthalates, tricresyl phosphate, phthallylglycollyl esters, and many others.

The present invention is directed to the preparation of plasticizers from certain products obtained by oxidation of cyclohexane and/or related compounds. In the preparation of adipic acid by oxidation of such compounds as cyclohexane, cyclohexanol and/or cyclohexanone, a mixture of succinic acid, glutaric acid and other products is obtained, after separation of adipic acid, and this mixture has recently been utilized for the first time, by hydrogenation to polyhydroxy compounds as disclosed in the copending application of G. F. Curtin, Jr., S. N. 146,155, filed February 24, 1950. The said polyhydroxy compounds are hexamethylene glycol, pentamethylene glycol, and tetramethylene glycol. While these individual glycols give useful plasticizers when esterified individually with adipic acid, outstandingly superior plasticizers are obtained upon esterification of mixtures of these glycols with adipic and/or certain other alkandioic acids, as described in detail hereinafter.

An object of this invention is to provide polyester plasticizers which are relatively inexpensive and which do not exude rapidly from blends thereof with polyvinyl chloride. Another object is to provide improved plasticized polyvinyl chloride compositions. Other objects of the invention appear hereinafter.

It has been discovered in accordance with this invention that an improved plasticizer composition comprises a polyester of adipic acid with glycols, said polyester having combined therein the relative weights of hexamethylene glycol, pentamethylene glycol, and tetramethylene glycol indicated by the area within the broken lines in the trilinear diagram appended hereto. The improved results herein disclosed are obtained when these polyesters have an acid number not exceeding 21, and are sufficiently highly polymerized to have an inherent viscosity, measured on an acetone solution of 1% concentration, of about 0.030 to 0.131.

The term "inherent viscosity" as herein employed is defined as follows:

$$\text{inherent viscosity} = \frac{\ln \frac{t \text{ (solution)}}{t \text{ (solvent)}}}{\text{concentration}}$$

where $t$ (solution) and $t$ (solvent) are the efflux times of the solution and solvent through a capillary viscometer. The concentration is expressed in grams of polyester/100 milliliters of solution.

The mixed glycol-adipic acid polyesters of this invention do not exude from a polyvinyl chloride composition over an extended period of time and they are therefore superior to the polyesters prepared from single glycol components, which exude relatively rapidly. For example, the polyester made from approximately equivalent quantities of pentamethylene glycol and hexamethylene glycol with a few percent of tetramethylene glycol did not exude in 20 months while the polyesters from adipic acid and pentamethylene glycol individually exuded in less than one month.

In the compositions of this invention the acid component of the ester is adipic acid. Other diabasic acids formed in the oxidation of cyclohexane, cyclohexanone and/or cyclohexanol may also be included. Moreover, the terminal hydroxyl of the polyester may be esterified with acetate or other alkanoate radical if desired. Moreover, esterification of the terminal acid groups of the polyester plasticizers with methanol has a highly beneficial effect.

The polyester plasticizers of this invention are compatible with the following resins: polyvinyl chloride, polyvinyl chloride-acetate, nitrocellulose, cellulose acetate-butyrate and polyvinyl butyral, among others.

The invention is illustrated further by means of the examples given below. In the tests referred to in these examples, the mixing of the polyvinyl chloride with the plasticizer was accomplished as follows. The following ingredients (except as otherwise noted):

62 parts of polyvinyl chloride
38 parts of plasticizer, and
2.5 parts of basic lead carbonate were dry-mixed with a spatula. The mixture was then milled on a rubber mill at a temperature of 150° C. for fifteen minutes after the composition had sheeted. Moldings (3" x 5" x 0.070" size) were prepared by heating at 160° C. for 6 minutes with no pressure and then holding for 9 minutes at a pressure at 200 p. s. i. and cooling under pressure. Samples being tested for exudation were stored either in envelopes or in the open. Exudation was evidenced by a "greasy" or "oily" appearance on the surface of the molding.

*Example 1.—Comparison of polyhexamethylene adipate with polyester from adipic acid, hexamethylene glycol, pentamethylene glycol and tetramethylene glycol*

Seventy-three and one-tenth grams of adipic acid was placed in a 3 neck, 500 ml. flask and 64.9 grams of hexamethylene glycol (10% excess) was added. The flask was fitted with a thermometer well, an inlet for introducing nitrogen below the level of the liquid and a distillation head for removing the distillate. The mixture was heated, with a Glascol heating mantle, for four hours and five minutes at atmospheric pressure. The maximum temperature reached was 236° C. The pressure was reduced and held at 3—11 mm. and the heating continued for an additional six hours and forty-five minutes during which time the maximum temperature was 269° C. The product weighed 110.9 grams and on cooling was a cream-colored, waxy solid which had an acid number of 2.0, a hydroxyl number of 17.0, a softening point of 57° C. and an inherent viscosity of 0.122.

A polyvinyl chloride composition containing 33 parts of this plasticizer, 2.5 parts of basic lead carbonate and 67 parts of polyvinyl chloride had the following properties:

| Brittleness Temperature | Stiffness, p. s. i. | 100% Modulus, p. s. i. | Tensile Strength, p. s. i. | Elongation, percent | Days to Exude |
|---|---|---|---|---|---|
| −30° C | 1,855 | 2,000 | 2,925 | 248 | <30 |

For comparison with the above result, 400 grams of adipic acid was placed in a three liter, three neck flask and 431 grams of mixed glycols (a mixture of equimolal amounts of hexamethylene glycol and pentamethylene glycol with a small amount (ca. 5%) of tetramethylene glycol, hydroxyl number of 917) was added. This is a 29% excess of glycols. The flask was fitted with a thermometer well, a high speed stirrer and a 1" x 30" packed column with a distillation head. Nitrogen for blanketing the reaction mixture was introduced around the stirrer shaft. The flask was heated with a Glascol heating mantle. The mixture was heated for 11 hours and the water of reaction was withdrawn at a 1/1 reflux ratio while the temperature rose from 128 to a maximum of 264° C. The mixture was heated under a vacuum of 15 mm. for 4.5 hours at a maximum temperature of 262° C.

Seven hundred two and five tenths grams of product was obtained which on cooling was a slightly tannish colored solid which had an acid number of 1.4, a hydroxyl number of 35, a melting range of 23–26° C. and an inherent viscosity of 0.131.

A polyvinyl chloride composition containing 33 parts of this placticizer, 2.5 parts of basic lead acetate and 67 parts of polyvinyl chloride had the following physical properties:

| Brittleness Temperature | Stiffness, p. s. i. | 100% Modulus, p. s. i. | Tensile Strength, p. s. i. | Elongation, percent | Days to Exude |
|---|---|---|---|---|---|
| −24° C | 1,150 | 1,300 | 2,700 | 386 | >420 |

*Example II*

Evaluation tests were carried out on a series of polyesters of adipic acid, with results as set forth in the following table.

TABLE I.—PHYSICAL PROPERTIES OF POLYVINYL CHLORIDE COMPOSITIONS[1] PLASTICIZED WITH 38% OF MIXED GLYCOL-ADIPIC ACID POLYESTERS

| Percent alpha-omega Glycol | | | Polyester | | | Composition | | | | | |
|---|---|---|---|---|---|---|---|---|---|---|---|
| $C_4$ | $C_5$ | $C_6$ | Acid No. | Intrinsic Viscosity $[\eta]$ | M. P. (° C.) | Brittleness Temp. (° C.) | Stiff. (p. s. i.) | 100% Modulus | Percent Elong. | Tensile Strength, p. s. i. | Time to Exude (Days) |
| --- | --- | 100 | (Average Values) | | 50 | −28 | 942 | 1,288 | 322 | 2,535 | <30 |
| --- | 10 | 90 | 1.7 | 0.121 | 43–54 | −26 | 935 | 1,300 | 308 | 2,600 | 5 |
| --- | 20 | 80 | 4.7 | 0.121 | 36.5–46 | −28 | 970 | 1,400 | 326 | 2,650 | 12 |
| --- | 30 | 70 | 1.8 | 0.120 | 32–41 | −36 | 979 | 1,325 | 344 | 2,625 | 27 |
| --- | 40 | 60 | 1.7 | 0.108 | | −29 | 1,010 | 1,350 | 340 | 2,550 | 180 |
| --- | [2]AS | | 1.4 | 0.131 | 25 | −26 | 1,153 | 1,435 | 307 | 2,635 | >420 |
| --- | [2]AS | --- | 0.1 | 0.104 | | −28 | 908 | 1,200 | 210 | 1,950 | >600 |
| --- | 60 | 40 | 1.7 | 0.125 | | −25 | 1,060 | 1,200 | 280 | 2,250 | >540 |
| --- | 70 | 30 | 1.6 | 0.129 | | −28 | 1,040 | 1,175 | 368 | 2,425 | >540 |
| --- | 100 | --- | 3.0 | 0.126 | 22–23 | −31 | | 1,280 | 313 | 2,369 | <30 |
| 5 | 40 | 55 | 1.5 | 0.106 | 27 | −16 | 948 | 1,225 | 342 | 2,375 | 270 |
| 15 | 50 | 35 | 1.3 | 0.102 | 17 | −26 | 950 | 1,400 | 256 | 2,400 | >330 |
| 20 | 35 | 45 | 1.4 | 0.099 | 22 | −22 | 1,060 | 1,000 | 328 | 2,500 | >330 |
| 10 | 30 | 60 | 1.1 | 0.087 | 27 | −30 | 1,230 | 1,150 | 340 | 2,425 | 180 |
| 100 | --- | --- | 9.0 | 0.13 | | −21 | 1,705 | 1,490 | 290 | 3,020 | <30 |

[1] Composition: 62 parts PVC-"Geon"-101; 38 parts plasticizer; 2.5 parts basic lead carbonate.
[2] AS is the hydrogenation product of the esterified non-volatile products (after separation of adipic acid) obtained by air oxidation of cyclohexanone in acetic acid solution with Ba-Mn-Co acetate catalyst at 84° C. It is a mixture of about equal weight quantities of pentamethylene glycol and hexamethylene glycol with a very minor quantity (estimated as 1.0 to 5.0%) of tetramethylene glycol.
< means "less than"; > means "more than."

For comparison with the above, similar tests were carried out on a series of polyesters of hexamethylene glycol with acids of the formula $(CH_2)_n(COOH)_2$, $n$ being from 2 to 4. The results are set forth in the following table.

TABLE II.—PHYSICAL PROPERTIES OF POLYVINYL CHLORIDE COMPOSITIONS[1] PLASTICIZED WITH 38% OF HEXAMETHYLENE GLYCOL-MIXED ACIDS POLYESTERS

| Percent Acid | | | Polyester | | | Composition | | | | | |
|---|---|---|---|---|---|---|---|---|---|---|---|
| $C_4$ | $C_5$ | $C_6$ | Acid No. | $[\eta]$ | M. P. (° C.) | Brittleness Temp. (° C.) | Stiffness (p. s. i.) | 100% Modulus | Percent Elong. | Tensile Strength (p. s. i.) | Time to Exude (Days) |
| --- | --- | 100 | (Ave. results) | | 50 | −28 | 942 | 1,288 | 322 | 2,535 | <30 |
| --- | 5 | 95 | 6.7 | 0.142 | 45 | −26 | 1,055 | 1,275 | 220 | 2,050 | 4 |
| --- | 10 | 90 | 0.9 | 0.158 | 45 | −30 | 1,250 | 1,685 | 256 | 2,720 | 4 |
| --- | 30 | 70 | 0.3 | 0.126 | 33 | −24 | 400 | 1,175 | 375 | 2,450 | <12 |
| --- | 40 | 60 | 0.6 | 0.112 | 28 | −24 | 835 | 1,050 | 342 | 2,275 | 360 |
| --- | 50 | 50 | 0.2 | 0.095 | 18 | −20 | 1,000 | 1,200 | 370 | 2,575 | >240 |
| --- | 75 | 25 | 1.4 | 0.114 | 11 | −22 | 1,060 | 1,500 | 304 | 2,675 | 180 |
| --- | 95 | 5 | 0.5 | 0.142 | 20 | −32 | 1,175 | 1,300 | 334 | 2,525 | 180 |
| --- | 100 | --- | 1.6 | 0.058 | 16 | −30 | | 990 | 424 | 2,504 | 700 |
| 10 | --- | 90 | 2.3 | 0.099 | | −31 | 935 | 1,350 | 328 | 2,550 | 2 |
| 20 | --- | 80 | 1.6 | 0.108 | 38 | −24 | 915 | 1,200 | 332 | 2,425 | 6 |
| 30 | --- | 70 | 2.0 | 0.114 | | −23 | 1,010 | 1,300 | 328 | 2,450 | 14 |
| 40 | --- | 60 | 2.3 | 0.124 | | −38 | 920 | 1,300 | 364 | 2,525 | 270 |
| 50 | --- | 50 | 1.2 | 0.124 | 19 | −26 | 1,175 | 1,500 | 330 | 2,500 | >540 |
| 100 | --- | --- | 2 | 0.147 | 43 | −17 | | 1,835 | 283 | 3,375 | <30 |

[1] Composition: 62 parts PVC-"Geon"-101; 38 parts plasticizer; 2.5 parts basic lead carbonate.

Example III

Plasticizer evaluation tests were carried out on a series of mixed glycol-mixed acid polyesters, said acids having the formula $(CH_2)_n(COOH)_2$, $n$ being 2 to 4. The results are set forth in the following table.

TABLE III.—PHYSICAL PROPERTIES OF POLYVINYL CHLORIDE COMPOSITIONS [1] PLASTICIZED WITH 38% OF MIXED GLYCOL-MIXED ACID POLYESTERS

| Percent Acid | | | Glycol | Polyester | | | Composition | | | | | |
|---|---|---|---|---|---|---|---|---|---|---|---|---|
| $C_4$ | $C_5$ | $C_6$ | | Acid No. | $[\eta]$ | M. P. (° C.) | Brittleness Temp. (° C.) | Stiff. (p. s. i.) | 100% Modulus | Percent Elong. | Tensile Strength (p. s. i.) | Time to Exude (Days) |
| 18 | 49 | 33 | AS | 0.9 | 0.108 | ---- | −23 | 1,135 | 1,300 | 370 | 2,525 | >540 |
| 7 | 21 | 72 | AS | 0.7 | 0.086 | 16.5 | −28 | 1,085 | 1,300 | 280 | 2,400 | >270 |
| 25 | 75 | -- | AS | 0.1 | 0.104 | ---- | −26 | 1,055 | 1,500 | 266 | 2,475 | >270 |
| -- | 50 | 50 | AS | 0.3 | 0.100 | 2 | −28 | 1,255 | 1,400 | 320 | 2,550 | >540 |

[1] Composition: 62 parts PVC-"Geon"-101; 38 parts plasticizer; 2.5 parts basic lead carbonate.

Example IV

A series of tests was made with AS-adipate polyester-modified polyvinyl chloride, with results as follows:

TABLE IV.—PROPERTIES OF VARIOUS MIXED GLYCOL ADIPATE POLYESTER PLASTICIZERS IN POLYVINYL CHLORIDE COMPOSITIONS [1]

| H+ No. | OH− No. | Inherent [2] Viscosity | Viscosity Poises 35° C. | Percent Plasticizer | $T_f$, ° C. | $T_{10}4$,[3] ° C. | Brittle Temp., ° C. | Stiffness, #/in.² | 100% Mod. #/in.² | Percent Elong. | Tensile Strength, #/in.² | Migration Resistance | | Furniture Mar,[4] Percent Surface Marred |
|---|---|---|---|---|---|---|---|---|---|---|---|---|---|---|
| | | | | | | | | | | | | Time to Exude | | |
| | | | | | | | | | | | | 25° C.+50% R. H. | 50° C.+100% R. H. | |
| .81 | 38 | .102 | 88 | 33 | −5 | ---- | −25 | 1,940 | 1,900 | 265 | 2,870 | None in 18 mos. to 2 yrs. | 152 / 115 | <15. |
| | | | | 38 | −15 | −7 | −27 | 1,140 | 1,360 | 320 | 2,600 | | | |
| 1.04 | 41 | .087 | 48 | 38 | ---- | ---- | −30 | 1,155 | 1,300 | 362 | 2,575 | None in 16 mos. | 132 | ca. 20. |
| .94 | 23 | .115 | 148 | 33 | ---- | ---- | −26 | 2,090 | 2,000 | 290 | 2,925 | None in 15 mos. | 95 / 77 | ca. 10. |
| | | | | 38 | ---- | ---- | −31 | 1,100 | 1,400 | 356 | 2,900 | | | |
| 1.4 | 223 | .033 | 8 | 38 | −26 | −10 | −42 | 2,405 | 1,700 | 274 | 2,405 | 1 day | 1 | >90, badly. |
| .9 | 177 | .041 | 8 | 38 | −24 | −10 | −38 | 1,865 | 1,265 | 294 | 2,125 | 4 days | 1 | Do. |
| 21 | 21 | .113 | 136 | 38 | ---- | ---- | −14 | 1,195 | 1,375 | 346 | 2,475 | None in 18 mos. | 15 | |
| 44.5 | 0 | .093 | 63 | 38 | ---- | ---- | −10 | 2,615 | 1,875 | 206 | 2,475 | Yes, 18 mos. | 5 | |
| 0.5 | [5] 2.4 | .032 | <8 | 38 | −24 | −15 | −32 | 850 | 900 | 284 | 2,800 | None in 11 mos. | 8 mos. | 50%. |
| 0.14 | [5] 2.6 | .031 | <8 | 38 | −21 | −14 | −30 | 815 | 700 | 318 | 1,850 | do | 8 mos. | 50%. |

[1] Compositions contained 33 parts plasticizer, 62 parts "Geon"-101, and 4% basic lead carbonate based on the resin. ASTM tests used.
[2] Inherent viscosity at 25° measured using 1% solution in acetone.
[3] Clash-Berg test for torsional stiffness: at $T_f$ stiffness=45,000 p. s. i.; $T_{10}4$ stiffness=10,000 p. s. i.
[4] Furniture mar—samples 2″ x 2″ held in contact with panel coated with nitrocellulose lacquer under ¼ #/in.² for 10 days at 25° C.
[5] End groups esterified with acetic anhydride.

Example V

Methyl esters of mixed acids of the formula $HOOC(CH_2)_nCOOH$ (per cent $C_4$ acid=27.5, per cent $C_5$=46.2, per cent $C_6$=26.3) were heated in a still with mixed glycols of the formula $HO(CH_2)_nOH$ (per cent $C_4$=21.1, per cent $C_5$=50.5, per cent $C_6$=28.4) in the presence of 0.3% by weight of zinc borate catalyst, methanol being taken overhead. The mol ratio of glycol/ester was initially 0.8. Heating was continued at 200° to 225° C. for 2.3 hours at atmospheric pressure, at which time the ester interchange reaction was virtually complete. The pressure on the system was then lowered to 10 mm., and distillation of monomeric ingredients was completed, after which the distillation residue was cooled. The catalyst remained dispersed in the resulting polyester, which had an acid number of 0.2, an hydroxyl number of 0.1 and an inherent viscosity of 0.05. When 38% by weight of this plasticizer was milled into polyvinyl chloride ("Geon"-101) along with 4% of basic lead carbonate as a stabilizer a product was obtained which had the properties given in Table V, Specimen A. In another preparation of polyester the methyl esters of mixed acids of the formula $HOOC(CH_2)_nCOOH$ (per cent $C_4$=25, per cent $C_5$=50, per cent $C_6$=25) were heated in a still with mixed glycols of the formula $HO(CH_2)_nOH$ (per cent $C_4$=26, per cent $C_5$=40.8, per cent $C_6$=33) in the presence of 0.3% by weight of zinc borate catalyst, methanol being taken overhead. The initial mol ratio of glycol/ester was 1.05. The heating was continued for 3.2 hours, after which acetic anhydride (15% of the weight of polyester) was added, and the mixture was heated for one hour under reflux, after which the volatile constituents were removed at 225° C. by lowering the pressure to 10 mm.

The resulting product had an acid number of 0.8, an hydroxyl number of 0.3, and an inherent viscosity of 0.046. When 38% by weight of this plasticizer was milled into polyvinyl chloride ("Geon"-101) along with 4% of basic lead carbonate as a stabilizer, a product was obtained which had the properties given in Table V, Specimen B. Specimen C was prepared in a similar manner, but without end group acetylation, using methyl esters of the same alkandioic acids ($C_4$ acid=25%, $C_5$=50%, $C_6$=25%) and the glycols ($C_4$=25%, $C_5$=50%, $C_6$=25% in the ratio of 1:0.8. Specimen C had an acid number of 0.5, hydroxyl number 10.9, and inherent viscosity 0.05. The table shows that good results were obtained even at low inherent viscosities when both the acid number and hydroxyl number were kept at a minimum.

The data when compared with the data presented hereinabove show that relatively low viscosity polyester may be used if the starting material is esterified, whereby the hydroxyl number is kept low. When no (or relatively little) of the $C_4$ acid component is employed in the low viscosity range (down to 0.03) the hydroxyl number may be as high as about 50, without excessive exudation under humid conditions; however, when a substantial quantity of the $C_4$ acid component is employed, the hydroxyl number at these low viscosities should be kept at a minimum. Moreover, when the inherent viscosity is the 0.087 level hereinabove illustrated, it is essential that the hydroxyl number be kept below about 15 to avoid an excessive exudation rate at high humidities. The table illustrates compositions in this low viscosity range, and even containing a substantial amount of C₄ acid component, which nevertheless do not exhibit excessive exudation.

TABLE V.—PROPERTIES OF PLASTICIZED POLYVINYL CHLORIDE CONTAINING LOW VISCOSITY POLYESTER HAVING LOW ACID AND HYDROXYL VALUES

| Designation of Specimen | Stiffness (p. s. i.) | 100% Modulus (p. s. i.) | Percent Ultimate Elongation | Tensile Strength (p. s. i.) | Brittleness Temp. (° C.) | Exudation | |
|---|---|---|---|---|---|---|---|
| | | | | | | 23° C., 58% R. H. | 50° C., 100% R. H. |
| A | 1,230 | 1,550 | 277 | 2,525 | −22 | None, 1 week | None, 1 week. |
| B | 950 | 1,200 | 350 | 2,500 | −22 | None, 4.5 months | Slight, 45 days. |
| C | 1,360 | 1,425 | 300 | 2,550 | −24 | None, 3.5 months | Slight, 15 days. |

The drawing illustrates the plasticized polyvinyl chloride compositions which did not exude in several months' time. The area bounded by the broken line defines the optimum compositions obtained in accordance with this invention. Typical actual exudation times are noted at various locations in the diagram.

It is to be understood that the examples given above are illustrative only and that numerous methods of practicing the invention will occur to those who are skilled in the art. For instance, the percentage of plasticizer in the polyvinyl chloride composition may be varied over a wide range, the quantity of plasticizer usually employed being, however, within the range of 25% to 75% of the total weight of plasticized resin. Antioxidants, stabilizers, etc., may be added if desired.

The plasticized polyvinyl chloride of this invention may be used in the manufacture of belts, tubing, electrical insulation (for wire coverings, jacketing, base plugs, etc.), sheeting, moldings, paper coatings, floor tile, coated fabrics, upholstery material, seat covers, drapery material, garment bags, table covers, luggage, leather substitutes (shoe uppers, weltings) and numerous other articles of commerce, particularly those involving application at elevated temperatures and requiring resistance to migration or extraction of the plasticizer.

I claim:

A plasticizer composition comprising a polyester of adipic acid, said polyester having combined therein the relative weight quantities of hexamethylene glycol, pentamethylene glycol, and tetramethylene glycol defined by the area within the broken lines in the accompanying trilinear diagram, said polyester having an acid number not exceeding 21 and an inherent viscosity, measured on an acetone solution of 1% concentration of from 0.030 to 0.131, the hydroxyl number being not greater than 15 when the inherent viscosity is below 0.087.

References Cited in the file of this patent

UNITED STATES PATENTS

| | | |
|---|---|---|
| 1,890,668 | Bradley | Dec. 13, 1932 |
| 1,897,260 | Kienle et al. | Feb. 14, 1933 |
| 2,071,250 | Carothers | Feb. 16, 1937 |
| 2,249,950 | Fuller | July 22, 1941 |
| 2,349,951 | Fuller et al. | May 30, 1944 |
| 2,437,046 | Rothrock | Mar. 2, 1948 |
| 2,460,186 | Moffett | Jan. 25, 1949 |
| 2,512,723 | Lanham | June 27, 1950 |
| 2,532,498 | Hoppens | Dec. 5, 1950 |
| 2,555,062 | K. W. Small et al. | May 29, 1951 |

FOREIGN PATENTS

| | | |
|---|---|---|
| 599,523 | Great Britain | Mar. 15, 1948 |
| 624,393 | Great Britain | June 7, 1949 |